US012013130B2

(12) United States Patent
Kim et al.

(10) Patent No.: US 12,013,130 B2
(45) **Date of Patent: *Jun. 18, 2024**

(54) INDUCTION HEATING TYPE COOKTOP HAVING IMPROVED USE CONVENIENCE

(71) Applicant: LG Electronics Inc., Seoul (KR)

(72) Inventors: Wontae Kim, Seoul (KR); Seongho Son, Seoul (KR); Jaekyung Yang, Seoul (KR); Yongsoo Lee, Seoul (KR); Hyunwoo Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,246

(22) Filed: Aug. 4, 2022

(65) Prior Publication Data

US 2022/0373187 A1 Nov. 24, 2022

Related U.S. Application Data

(63) Continuation of application No. 16/558,039, filed on Aug. 31, 2019, now Pat. No. 11,441,783.

(30) Foreign Application Priority Data

Aug. 31, 2018 (KR) ........................ 10-2018-0103957

(51) Int. Cl.
*F24C 7/08* (2006.01)
*H05B 3/74* (2006.01)
(Continued)

(52) U.S. Cl.
CPC ............. *F24C 7/087* (2013.01); *H05B 3/748* (2013.01); *H05B 6/105* (2013.01); *H05B 6/1209* (2013.01); *H05B 6/1263* (2013.01)

(58) Field of Classification Search
CPC ...... H05B 6/1263; H05B 6/105; H05B 3/748; H05B 6/1209; F24C 7/087
See application file for complete search history.

(56) References Cited

U.S. PATENT DOCUMENTS 6,770,857 B2 8/2004 Hirota et al.
2001/0019052 A1* 9/2001 Sadahira .................. H05B 6/36 219/629

(Continued)

FOREIGN PATENT DOCUMENTS

DE 10127051 12/2002
DE 10127051 A1 * 12/2002 ........... H05B 6/1209

(Continued)

OTHER PUBLICATIONS

EP Search Report in European Application No. EP 19193985, dated Jan. 23, 2020, 9 pages.

(Continued)

*Primary Examiner* — Thien S Tran
(74) *Attorney, Agent, or Firm* — Fish & Richardson P.C.

(57) ABSTRACT

An induction heating type cooktop includes a case, a cover plate that is coupled to an upper end of the case and that includes an upper plate configured to seat an object on an upper surface of the upper plate, a working coil disposed in the case and configured to heat the object, a thin film attached on the upper plate, and a thermal insulating member disposed vertically between a lower surface of the upper plate and the working coil.

21 Claims, 9 Drawing Sheets

(51) Int. Cl.
*H05B 6/10* (2006.01)
*H05B 6/12* (2006.01)

(56) References Cited

U.S. PATENT DOCUMENTS

| | | | | |
|---|---|---|---|---|
| 2004/0245244 | A1 * | 12/2004 | Hirota | H05B 6/1254 219/624 |
| 2005/0115958 | A1 * | 6/2005 | Hoh | H05B 6/1263 219/620 |
| 2011/0073588 | A1 | 3/2011 | Kusaka et al. | |
| 2012/0080423 | A1 * | 4/2012 | Takeda | C25D 1/04 219/600 |
| 2012/0223070 | A1 * | 9/2012 | Matsui | H05B 6/1263 219/677 |

FOREIGN PATENT DOCUMENTS

| | | |
|---|---|---|
| DE | 102015002201 | 8/2016 |
| EP | 2288231 | 2/2011 |
| JP | S6340288 | 2/1988 |
| JP | 2002056959 | 2/2002 |
| JP | 2006120493 | 5/2006 |
| JP | 2006138553 | 6/2006 |
| JP | 2008041485 | 2/2008 |
| JP | 2008311058 | 12/2008 |
| JP | 5630495 | 5/2013 |
| KR | 10-2004-0089074 | 10/2004 |
| KR | 10-2004-0093159 | 11/2004 |
| WO | WO2011048816 | 4/2011 |

OTHER PUBLICATIONS

Office Action in Korean Appln. No. 10-2020-0158981, dated Jan. 19, 2023, 13 pages (with English translation).

Office Action in Korean Appln. No. 20180103957, dated Jan. 19, 2023, 12 pages (with English translation).

* cited by examiner

INDUCTION HEATING TYPE COOKTOP HAVING IMPROVED USE CONVENIENCE

CROSS-REFERENCE TO RELATED APPLICATION

This application is a continuation of U.S. application Ser. No. 16/558,039, filed on Aug. 31, 2019, which claims priority to and the benefit of Korean Patent Application No. 10-2018-0103957, filed on Aug. 31, 2018, the disclosures of which are incorporated herein by reference in their entirety.

TECHNICAL FIELD

The present disclosure relates to an induction heating type cooktop having improved use convenience.

BACKGROUND

Various types of cooking utensils may be used to heat food in homes and restaurants. For example, gas ranges may use gas as fuel. In some cases, cooking devices may use electricity to heat an object such as a vessel (or a cooking vessel) or a pot, for example.

A method of heating an object via electricity may be classified into a resistive heating method and an induction heating method. In the electrical resistive method, heat may be generated based on current flowing through a metal resistance wire or a non-metallic heating element, such as silicon carbide, and may be transmitted to the object (for example, the cooing vessel) through radiation or conduction, to heat the object. In the induction heating method, eddy current may be generated in the object made of metal based on a magnetic field generated, around the coil, when a high-frequency power of a predetermined magnitude is applied to the coil to heat the object.

The induction heating method may be used for many cooktops.

In some cases, the cooktop using the induction heating method may only heat an object made of a magnetic material. When an object made of a non-magnetic material (for example, heat-resistant glass, pottery, and the like) is placed on the cooktop, the cooktop using the induction heating method may not be able to heat the object.

In some examples, a heating device may include a heating plate located between a cooktop and a nonmagnetic material. The heating plate may be heated through an induction heating method. In some cases, the heating device including the heating plate may have a degraded heating efficiency, and may take a relatively long time to boil water compared to other heating devices.

In some examples, a hybrid cooktop may heat the non-magnetic material through a radiant heater that uses the electric resistance method, and heat the magnetic material by a working coil that uses an induction heating method. In some cases, the radiant heater may have low output and degraded heating efficiency. In some cases, a user may experience inconvenience in considering a material of the object when the user places the object in the heating area.

In some examples, a cooktop may heat objects made of metal (i.e., metals including non-magnetic materials and magnetic materials). In some cases, a non-metallic object may not be heated through a method using the cooktop. In some cases, when a metal object, which is not magnetized, is heated, the heating efficiency may be lower than that of other heating methods using the radiant heater, and cost of the material may be higher than that of other heating methods using the radiant heater.

SUMMARY

The present disclosure provides an induction heating type cooktop capable of heating both a magnetic material and a non-magnetic material.

The present disclosure also provides an induction heating type cooktop that may directly or indirectly heat an object with the same heat source.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and the advantages of the present disclosure may be implemented by features defined in claims and a combination thereof.

According to one aspect of the subject matter described in this application, an induction heating type cooktop includes a case, a cover plate that is coupled to an upper end of the case and that includes an upper plate configured to seat an object on an upper surface of the upper plate, a working coil disposed in the case and configured to heat the object, a thin film attached on the upper plate, and a thermal insulating member disposed vertically between a lower surface of the upper plate and the working coil.

Implementations according to this aspect may include one or more of the following features. For example, the thin film may be coated on the upper surface of the upper plate or a lower surface of the upper plate. In some examples, the thin film may be made of a conductive material and has a magnetic property. In other examples, the thin film may be made of a conductive material and has a non-magnetic property. In some examples, a thickness of the thin film may be between 0.1 μm and 1,000 μm, and the thin film may be configured to, based on an electrical resistance of the thin film, be heated by the working coil by induction.

In some implementations, the working coil may be configured to, based on a magnetic object being placed on the upper surface of the upper plate, be driven to heat the magnetic object, and the thin film may be configured to, based on the magnetic object being placed on the upper surface of the upper plate, define an equivalent circuit including (i) a resistance component and an inductor component of the magnetic object and (ii) a resistance component and an inductor component of the thin film.

In some implementations, the resistance component and the inductor component of the magnetic object in the equivalent circuit are connected to each other electrically in series, and the resistance component and the inductor component of the thin film in the equivalent circuit are connected to each other electrically in series. The resistance component and the inductor component of the thin film in the equivalent circuit may be connected to the resistance component and the inductor component of the magnetic object electrically in parallel.

In some examples, an electrical impedance defined by the resistance component and the inductor component of the magnetic object in the equivalent circuit may be less than an electrical impedance defined by the resistance component and the inductor component of the thin film. In some examples, a magnitude of an eddy current applied to the magnetic object may be greater than a magnitude of an eddy current applied to the thin film.

In some implementations, the working coil may be configured to, based on a non-magnetic object being placed on the upper surface of the upper plate, be driven to heat the non-magnetic object through the thin film, where the thin film has an electrical impedance, and the non-magnetic object does not have an electrical impedance. In some examples, the thin film may be configured to, based on the non-magnetic object being placed on the upper surface of the upper plate, carry an eddy current, where the eddy current is not applied to the non-magnetic object.

In some implementations, the working coil may be configured to: based on a magnetic object being placed on the upper surface of the upper plate, heat the magnetic object by induction; and based on a non-magnetic object being placed on the upper surface of the upper plate, heat the thin film by induction to thereby heat the non-magnetic object by the heated thin film.

In some implementations, the induction heating type cooktop may further include: a shielding plate disposed at a lower surface of the working coil and configured to block a magnetic field generated vertically below the working coil based on the working coil being driven; a support member disposed between a lower surface of the shielding plate and a lower surface of the case and configured to support the shielding plate upward; and a cooling fan disposed inside the case and configured to cool the working coil. In some examples, the support member may include an elastic body configured to support the shielding plate upward.

In some examples, the cooling fan may be configured to draw external air from an outside of the case and transfer the drawn external air toward the working coil, or draw internal air from an inside of the case and discharge the drawn internal air toward the outside of the case. The thermal insulating member may be configured to block heat transfer, to the working coil, from the object or the thin film heated based on the working coil being driven.

In some implementations, the thin film may be configured to contact the object placed on the upper surface of the upper plate. In some implementations, the thin film may be configured to, based on a non-magnetic object being placed on the upper surface of the upper plate, define an equivalent circuit including a resistance component and an inductor component of the thin film, where the working coil may be configured to, based on the non-magnetic object being placed on the upper surface of the upper plate, be driven to heat the non-magnetic object by heat generated from the thin film by induction.

In some implementations, the thin film may be located vertically above the working coil at a position corresponding to the working coil, and the thin film may have a predetermined thickness that enables the thin film to be inductively heated by the working coil. For example, a thickness of the thin film may be between 0.1 μm and 1,000 μm. In some implementations, the thin film may have a ring shape comprising a plurality of concentric circles having different diameters.

In some implementations, the induction heating type cooktop may further further include: a plurality of working coils disposed in the case and spaced apart from one another, the plurality of working coils including the working coil; and a plurality of thin films attached to the upper plate and spaced apart from one another, the plurality of thin films including the thin film. Each of the plurality of thin films may be positioned vertically above at a position corresponding to one of the plurality of working coils.

A specific effect of the present disclosure, in addition to the above-mentioned effect, will be described together while describing a specific matter to implement the present disclosure.

DETAILED DESCRIPTION

Figure 1:
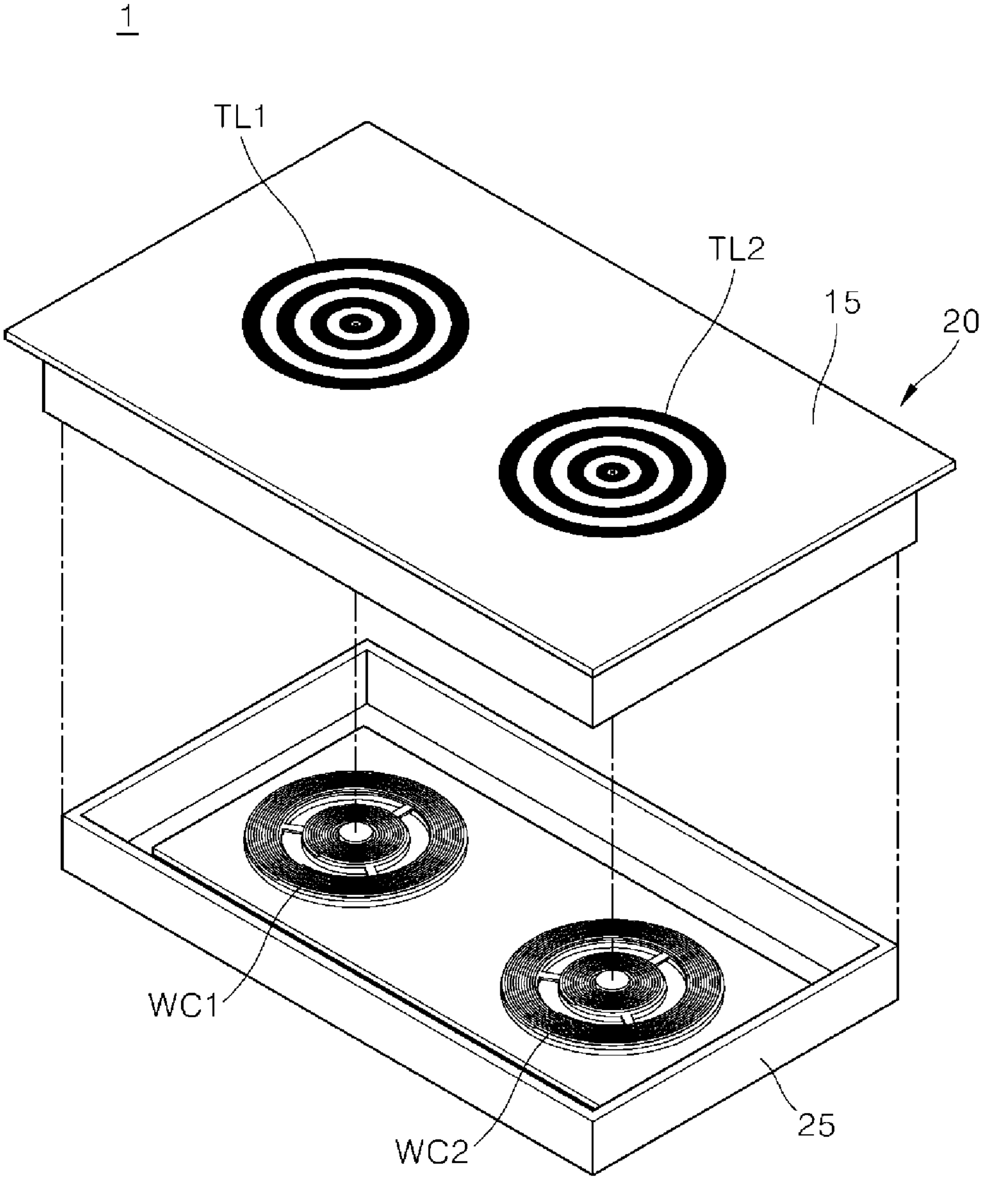
FIG. 1 shows an example of an induction heating type cooktop.

Hereinafter, one or more implementations of the present disclosure will be described in detail with reference to the accompanying drawings. In the drawings, same reference numerals are used to indicate the same or similar elements.

Figure 2:
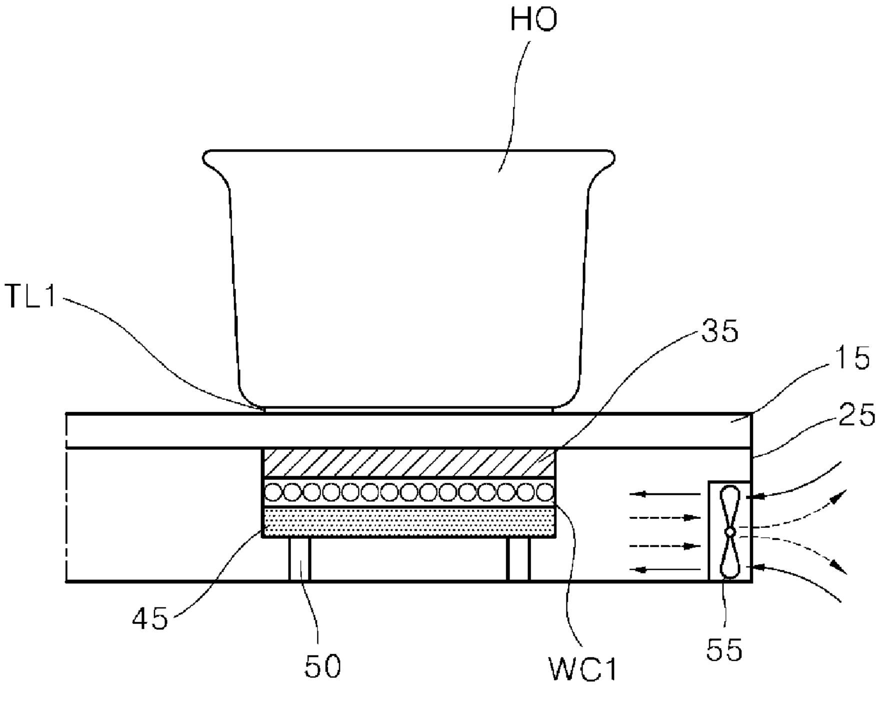
FIG. 2 shows example components and an example case of the induction heating type cooktop shown in FIG. 1.
Figure 3:
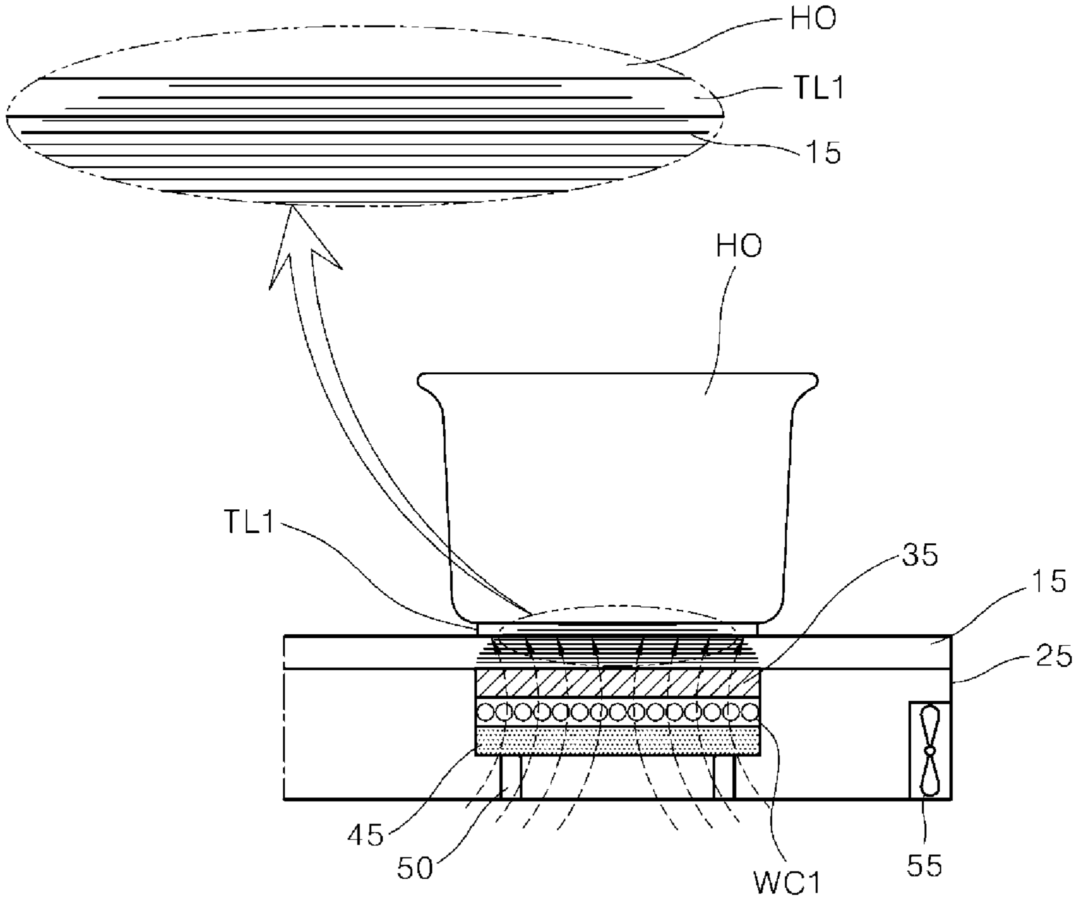
FIGS. 3 and 4 show examples of relation between a thickness of a thin film and a current skin depths of the thin film.
Figure 4:
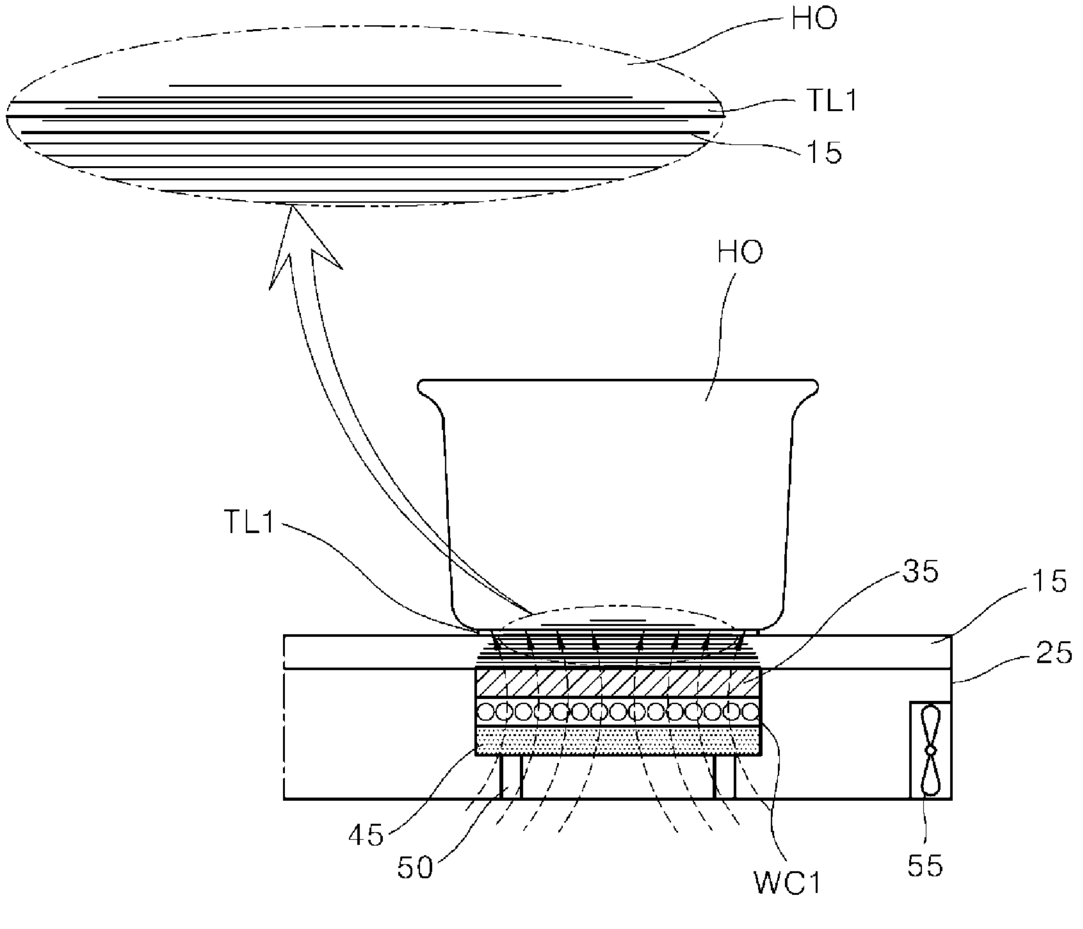
Figure 5:
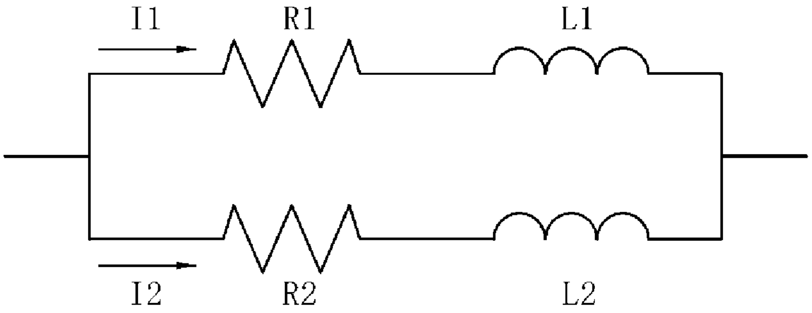
FIGS. 5 and 6 show examples of change in impedance between thin films and objects depending on types of the objects.
Figure 6:

FIG. 1 shows an example of an induction heating type cooktop. FIG. 2 shows example components disposed in an example case of the induction heating type cooktop shown in FIG. 1. FIGS. 3 and 4 show example properties of a skin depth according to a relative permeability of example thin films. FIGS. 5 and 6 show examples of change in impedance between thin films and objects depending on types of the objects.

In some implementations, referring to FIG. 1, an induction heating type cooktop 1 may include a case 25, a cover plate 20, working coils WC1 and WC2 (i.e., a first working coil and a second working coil), and thin films TL1 and TL2 (i.e., a first thin film and a second thin film).

In some examples, the working coils WC1 and WC2 may be installed in the case 25.

In some implementations, in addition to the working coils WC1 and WC2, various types of devices related to driving of the working coil (for example, a power supply that provides AC power, a rectifier that rectifies the AC power of the power supply into a DC power, an inverter that converts the DC power rectified by the rectifier into a resonance current through a switching operation and provides the same to the working coil, a control module to control the operation of various types of devices in the induction heating type cooktop 1, relays or semiconductor switches that turn on or turn off the working coil, and the like) may be installed in the case 25, but details thereof are omitted.

The cover plate 20 may include an upper plate 15 coupled to an upper end of the case 25 and configured to seat an object at an upper surface of the upper plate.

For example, the cover plate 20 may include the upper plate 15 to place an object such as a cooking vessel, a pan, a pot, etc. The object may be made of various materials such as stainless steel, aluminum, iron, ceramic, etc. The object may be made of a metallic material or a non-metallic material. In some cases, the object may have a magnetic property and a non-magnetic property. For instance, the object may include a magnetic material (e.g, a ferrous metal or a ferromagnetic material) such as cast iron, stainless steel, cobalt, nickel, or any combination thereof. In another, the object may include a non-magnetic material (e.g., a non-ferrous metal or a non-ferromagnetic material) such aluminum, copper, ceramic, glass, etc. In some cases, the object may be made of an alloy of ferromagnetic materials, an alloy of non-ferromagnetic materials, or an alloy of a ferromagnetic material(s) and non-ferromagnetic material(s).

The upper plate 15 may be made of, for example, a glass (for example, ceramics glass).

In some examples, the upper plate 15 may include an input interface that may receive an input from the user and transmit the input to the control module configured to control the input interface. In some examples, the input interface may be provided at a position other than the upper plate 15. For instance, the input interface include one or more of a touch panel, a physical button, a knob, a pressure sensor such as a piezo sensor, an audio sensor, or a video sensor, etc.

In some implementations, the input interface may be a module configured to receive input such as a heating intensity desired by the user, a driving time of the induction heating type cooktop 1, and the like. The input interface may be variously implemented with a physical button or a touch panel. In some implementations, the input interface may include, for example, a power button, a lock button, a power level control button (+, −), a timer control button (+, −), a charge mode button, and the like. The input interface may transmit the input provided by the user to the control module for the input interface, and the control module for the input interface may transmit the input to the control module (e.g., a control module for an inverter). In some examples, the above-described control module may control the operation of various types of devices (for example, working coils) based on the input (that is, the input of the user) provided by the control module for the input interface.

In some implementations, the control module may include a printed circuit board or an integrated circuit that is disposed in the case 25. In some cases, the control module may be remote from the input interface and configured to communicate with the input interface via one or more wires or via wireless communication.

In some implementations, whether the working coils WC1 and WC2 are driven and heating intensity (i.e., thermal power) of the working coils WC1 and WC2 may be visually displayed in the upper plate 15 in a shape of a heating zone. The shape of the heating zone may be displayed by an indicator including a plurality of light emitting elements (for example, LEDs) provided in the case 25.

The working coils WC1 and WC2 may be installed inside the case 25 and configured to heat the object.

In some implementations, driving of the working coils WC1 and WC2 may be controlled by the above-described control module, and may be driven by the control module when the object is placed on the upper plate 15.

In some implementations, the working coils WC1 and WC2 may directly heat a magnetic object (that is, an object made of a magnetic material such as iron, steel, cobalt, nickel, etc.), and may indirectly heat a non-magnetic object (that is, an object made of a non-magnetic material such as aluminum, copper, ceramic, glass, etc.) through the thin films TL1 and TL2 descried below.

The working coils WC1 and WC2 may heat the object through the induction heating method and may be overlapped with the thin films TL1 and TL2 in a longitudinal direction thereof (i.e., a vertical direction or an up-down direction thereof). For example, the thin film TL may be located vertically above the working coil WC1 at a position corresponding to the working coil WC1.

In some implementations, as shown in FIG. 1, two working coils WC1 and WC2 may be installed in the case 25, but the present disclosure is not limited thereto. For example, one working coil or three or more working coils may be installed in the case 25, but for convenience of explanation, the present disclosure describes an example implementation having two working coils WC1 and WC2 installed in the case 25.

In some implementations, the thin films TL1 and TL2 may be coated on the upper plate 15 to heat the non-magnetic material in the object.

Specifically, the thin films TL1 and TL2 may be coated on the upper surface or the lower surface of the upper plate 15 and may be overlapped with the working coils WC1 and WC2 in the longitudinal direction thereof (i.e., a vertical direction thereof or an up-down direction thereof). Thus, the object may be heated irrespective of the positions and types of the object.

In some implementations, the thin films TL1 and TL2 may have at least one of magnetic and non-magnetic properties (that is, a magnetic property, a non-magnetic property, or both magnetic property and non-magnetic property). For example, the thin films TL1 and TL2 may be made of magnetic metallic materials, ceramic, ferrite, composite materials, or any combination thereof.

In some implementations, the thin films TL1 and TL2 may be made of, for example, a conductive material (e.g., aluminum). As shown in FIG. 1, the thin films TL1 and TL2 may have a ring shape including a plurality of rings having different diameters from one another. The thin films TL1 and TL2 having the ring shape may be coated on the upper surface of the upper plate 15, but is not limited thereto. For example, the thin films TL1 and TL2 may be coated on a lower surface of the upper plate 15 or may be embedded inside the upper plate 15.

In some implementations, the thin films TL1 and TL2 may be made of a material other than a conductive material, or the thin films TL1 and TL2 having other shapes may be coated on the upper plate 15. However, for convenience of explanation, the present disclosure describes an example implementation that include the thin films TL1 and TL2 that are each made of a conductive material and have a form in which the plurality of rings having different diameters from one another are repeated, and the thin films TL1 and TL2 having the form are coated on the upper plate 15.

In some implementations, two thin films TL1 and TL2 are shown in FIG. 1, but the present disclosure is not limited thereto. That is, one thin film or three or more thin films may be coated, but for convenience of explanation, in one implementation of the present disclosure, two thin films TL1 and TL2 are coated.

Details of the thin films TL1 and TL2 will be described below.

Referring to FIG. 2, the induction heating type cooktop 1 may further include a thermal insulating member 35, a shielding plate 45, a support member 50, and a cooling fan 55.

In some implementations, components placed around the first working coil WC1 and the components placed around the second working coil (WC2 in FIG. 1) are the same. Hereinafter, for convenience of explanation, the components placed around the first working coil WC1 (the first thin film TL1, the thermal insulating member 35, the shielding plate 45, the support member 50, and the cooling fan 55) will be described.

The thermal insulating member 35 may be provided between the lower surface of the upper plate 15 and the first working coil WC1. The thermal insulating member 35 may be made of a thermal insulating material such as polymer, glass, ceramic, etc.

Specifically, the thermal insulating member 35 may be mounted on the lower surface of the cover plate 20, that is, the upper plate 15, and the first working coil WC1 may be placed below the thermal insulating member 35.

The thermal insulating member 35 may prevent the heat generated when the first thin film TL1 or the object HO is heated based on the driving of the first working coil WC1 from being transmitted to the first working coil WC1.

That is, when the first thin film TL1 or the object HO is heated through the electromagnetic induction of the first working coil WC1, the heat of the first thin film TL1 or the object HO is transmitted to the upper plate 15, and the heat of the upper plate 15 is transmitted to the first working coil WC1 to damage the first working coil WC1.

As described above, the thermal insulating member 35 may prevent the heat from being transmitted to the first working coil WC, thereby preventing the first working coil WC1 from being damaged due to the heat, and preventing heating performance of the first working coil WC1 from being degraded.

In some implementations, a spacer may be provided between the first working coil WC1 and the thermal insulating member 35. In other implementations, the spacer may be not be provided between the first working coil WC1 and the thermal insulating member 35.

Specifically, the spacer may be inserted between the first working coil WC1 and the thermal insulating member 35 so that the first working coil WC1 does not directly contact the thermal insulating member 35. Accordingly, the spacer may prevent the heat generated when the first thin film TL1 or the object HO is heated based on the driving of the first working coil WC1 from being transmitted to the first working coil WC1 through the thermal insulating member 35.

That is, the spacer may partially divide a role of the thermal insulating member 35, so that thickness of the thermal insulating member 35 may be minimized and a distance between the object HO and the first working coil WC1 may be minimized.

Further, a plurality of spacers may be provided, and the plurality of spacers may be spaced apart from one another, and the plurality of spacers may be placed between the first working coil WC1 and the thermal insulating member 35. Accordingly, the air suctioned into the case 25 by the cooling fan 55, which is described below, may be guided, by the spacer, to the first working coil WC1.

That is, the spacer may guide the air introduced into the case 25 by the cooling fan 55 to be properly transmitted to the first working coil WC1, thereby improving a cooling efficiency of the first working coil WC1.

The shielding plate 45 is mounted on the lower surface of the first working coil WC1 and may block the magnetic field generated below the first working coil WC1 when the first working coil WC1 is driven.

Specifically, the shielding plate 45 may block the magnetic field generated below when the first working coil WC1 is driven, and may be supported upward by the support member 50.

The support member 50 may be installed between the lower surface of the shielding plate 45 and the lower surface of the case 25 to support the shielding plate 45 upward.

Specifically, the support member 50 may indirectly support the thermal insulating member 35 and the first working coil WC1 upward by supporting the shielding plate 45 upward, to thereby the thermal insulating member 35 may closely contact the upper plate 15.

As a result, it is possible to maintain a distance between the first working coil WC1 and the object HO.

For example, the support member 50 may include, for example, an elastic body (for example, a spring) to support the shielding plate 45 upward, but is not limited thereto. Further, the support member 50 is not an essential component, and may be omitted from the induction heating type cooktop 1.

The cooling fan 55 may be installed inside of the case 25 to cool the first working coil WC1.

In some implementations, driving of the cooling fan 55 may be controlled by the above-described control module, and may be installed at a side wall of the case 25. In some examples, the cooling fan 55 may be installed at a position other than the side wall of the case 25. In an implementation of the present disclosure, for convenience of explanation, the cooling fan 55 is installed at the side wall of the case 25.

Further, as shown in FIG. 2, the cooling fan 55 may suction the air outside of the case 25 and transmit the suctioned air to the first working coil WC1 or suction air (particularly, heat) inside of the case 25 and discharge the suctioned air to the outside of the case 25.

Thus, efficient cooling of the components (particularly, the first working coil WC1) inside of the case 25 may be performed.

Further, as described above, the air outside of the case 25, which is transmitted to the first working coil WC1 by the cooling fan 55, may be guided to the first working coil WC1 by the spacer. Thus, direct and efficient cooling of the first working coil WC1 may be performed, thereby improving durability of the first working coil WC1 (i.e., improving the durability thereof to prevent thermal damage).

As described above, the induction heating type cooktop 1 may have the above-described characteristics and configurations. Hereinafter, the above-described characteristics and configurations of the thin film are described in more detail with reference to FIGS. 3 to 6.

FIGS. 3 and 4 show relation between thickness of thin films and skin depths of thin films, respectively. FIGS. 5 and 6 show changes in impedance between thin films and objects depending on types of objects, respectively.

In some implementations, the first thin film TL1 and the second thin film TL2 have the same technical characteristics and the thin films TL1 and TL2 may be coated on the upper surface or the lower surface of the upper plate 15. Hereinafter, for convenience of explanation, the first thin film TL1 coated on the upper surface of the upper plate 15 will be described.

The characteristics of the first thin film TL1 will be described below.

First, the first thin film TL1 may be made of a material having a low relative permeability.

Specifically, as the first thin film TL1 has a low relative permeability, the first thin film TL1 may have a greater skin depth. Here, the skin depth refers to a depth to which current penetrates from a surface made of a material, and the relative permeability may be inversely proportional to the skin depth. Accordingly, the lower the relative permeability of the first thin film TL1, the greater the skip depth of the first thin TL1.

Further, the skin depth of the first thin film TL1 may be greater than the thickness of the first thin film TL1. That is, the first thin film TL1 may have a thin thickness (for example, 0.1 μm to 1,000 μm), and the skin depth of the first thin film TL1 may be greater than the thickness of the first thin film TL1, so that the magnetic field generated by the first working coil WC1 is transmitted to the object HO through the first thin film TL1, thereby inducing an eddy current to the object HO.

That is, as shown in FIG. 3, when the skin depth of the first thin film TL1 is less than the thickness of the first thin film TL1, the magnetic field generated by the first working coil WC1 is difficult to be reach to the object HO.

In some implementations (e.g., as shown in FIG. 4), when the skin depth of the first thin film TL1 is greater than the thickness of the first thin film TL1, most of the magnetic fields generated by the first working coil WC1 may be transmitted to the object HO. That is, in one implementation of the present disclosure, as the skin depth of the first thin film TL1 is greater than the thickness of the first thin film TL1, the magnetic field generated by the first working coil WC1 passes through the first thin film TL1 and most of the magnetic field disappears at the object HO, to thereby mainly heat the object HO.

In some implementations, the first thin film TL1 has a less thickness as described above, and may have a resistance value to a degree in which it may be heated by the first working coil WC1. For instance, the thin film TL1 may have a predetermined thickness that enables the thin film TL1 to be heated by the working coil by induction.

Specifically, the thickness of the first thin film TL1 may be in inverse proportion to the resistance value (i.e., a surface resistance value) of the first thin film TL1. That is, as the thickness of the first thin film TL1 coated on the upper plate 15 decreases, the resistance value (that is, the surface resistance) of the first thin film TL1 may increase. Thus, the first thin film TL1 may be coated on the upper plate 15 with a thickness less than a threshold thickness, so that the property of the first thin film TL1 may be changed to a heatable load. In some cases, when the thickness of the first thin film TL1 is greater than the threshold thickness, the thin film TL1 may not be inductively heated by the working coil.

In some implementations, the first thin film TL1 may have a thickness of, for example, between 0.1 μm and 1,000 μm, but is not limited thereto.

The properties of impedance between the first thin film TL1 and the object H may be changed depending on whether the object HO placed on the upper surface of the upper plate 15 is made of the magnetic material or the non-magnetic material because the first thin film TL1 having the above feature is present to heat the non-magnetic material.

First, a case in which the object is made of the magnetic material will be described as follows.

Referring to FIGS. 2 and 5, when the magnetic object HO is placed on the upper surface of the upper plate 15 and the first working coil WC1 is driven, a resistance component R1 and an inductor component L1 of the magnetic object HO may form an equivalent circuit with the resistance component R2 and the induction component L2 of the first thin film TL1.

In some cases, the impedance of the magnetic object (i.e., the impedance including R1 and L1) may be less than the impedance of the first thin film TL1 (i.e., the impedance including R2 and L2), in the equivalent circuit.

Accordingly, when the above-described equivalent circuit is formed, a magnitude of the eddy current I1 applied to the magnetic object HO may be greater than that of the eddy current I2 applied to the first thin film TL1. More specifically, most eddy currents are applied to the object HO so that the object HO may be heated. That is, when the object HO is made of the magnetic material, the above-mentioned equivalent circuit may be formed, and most eddy currents may be applied to the object HO. The first working coil WC1 may directly heat the object HO.

In some implementations, a portion of the eddy current is also applied to the first thin film TL1 and the first thin film TL1 is slightly heated, so that the object HO may be slightly heated indirectly by the first thin film TL1. However, a degree to which the object HO is indirectly heated by the first thin film TL1 may not be significant compared to a degree in which the object HO is directly heated by the first working coil WC1.

One or more examples cases in which the object is made of the non-magnetic material will be described as follows.

Referring to FIGS. 2 and 6, when the non-magnetic object HO is placed on the upper surface of the upper plate 15 and the first working coil WC1 is driven, the impedance is not present in the non-magnetic object HO and the impedance may be present in the first thin film TL1. That is, the resistance component R and the induction component L may be present only in the first thin film TL1.

Thus, the eddy current I is applied only to the first thin film TL1, and the eddy current may not be applied to the non-magnetic object HO. More specifically, the eddy current I may be only applied to the first thin film TL1, so that the first thin film TL1 may be heated.

That is, when the object HO is made of the non-magnetic material, as described above, the eddy current I is applied to the first thin film TL1 so that the first thin film TL1 is heated. Thus, the non-magnetic object HO may be indirectly heated by the first thin film TL1 that is heated by the first working coil WC1.

In summary, regardless of whether the object HO is made of a magnetic material or a non-magnetic material, the object HO may be directly or indirectly heated by one heat source, that is, the first working coil WC1. For example, when the object HO is made of the magnetic material, the first working coil WC1 directly may heat the object HO, and when the object HO is made of the non-magnetic material, the first thin film TL1 heated by the first working coil WC1 may indirectly heat the object HO.

As described above, the induction heating type cooktop 1 may heat one or more objects that are made of both the magnetic material and the non-magnetic material, and may heat the object regardless of the positions or the types of the object. Accordingly, the user may place the object on any heating zone on the upper plate without needing to know whether the object is made of the magnetic material or the non-magnetic material, thereby improving the use convenience.

In some implementations, the induction heating type cooktop 1 may directly or indirectly heat an object with the same heat source, and it is not required to provide an additional heating plate or radiant heater. As a result, the induction heating type cooktop may improve heating efficiency thereof and reduce cost of a material thereof compared to a case in related art.

Hereinafter, an example induction heating type cooktop will be described.

Figure 7:
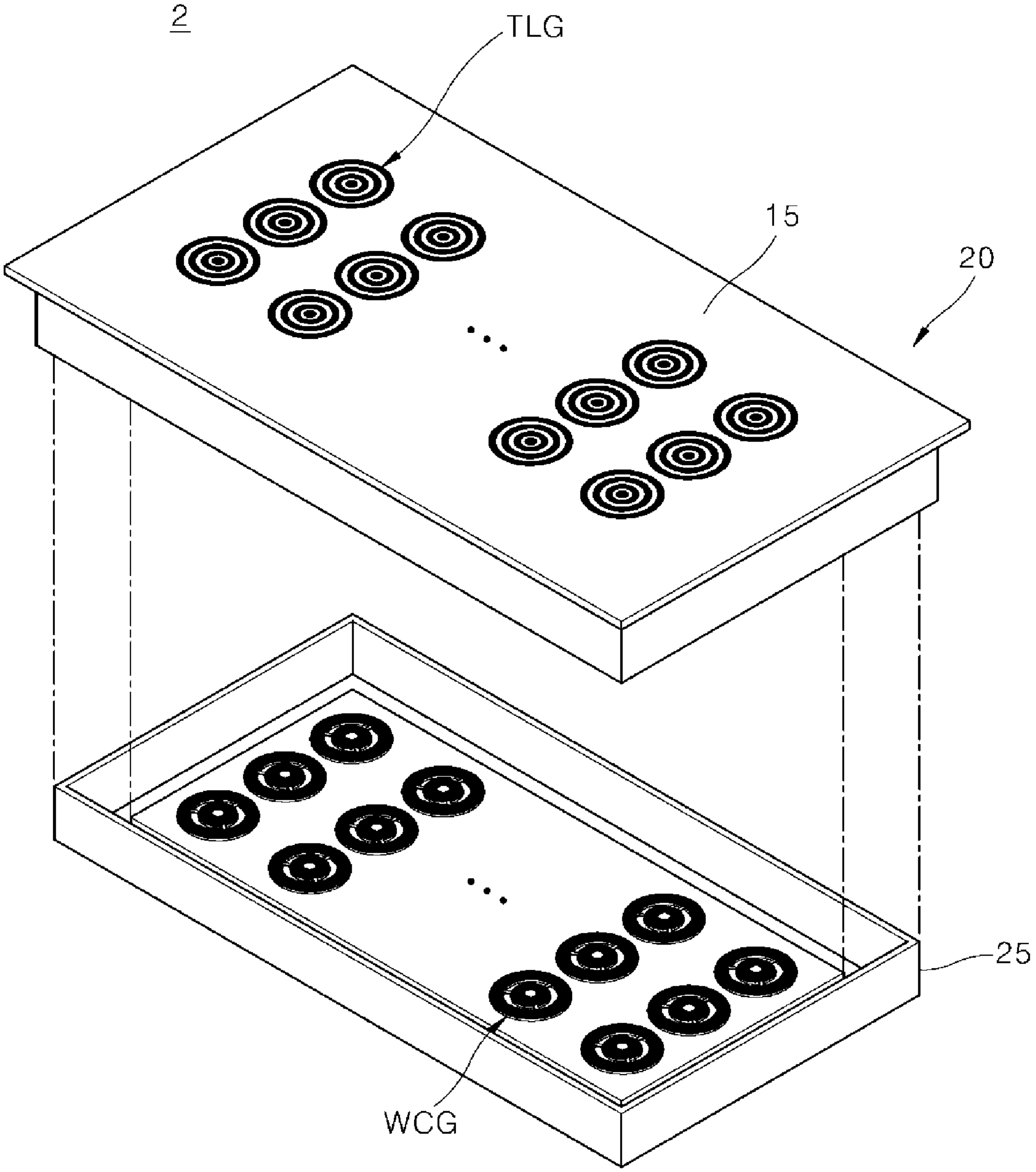
FIG. 7 shows an example of an induction heating type cooktop.
Figure 8:
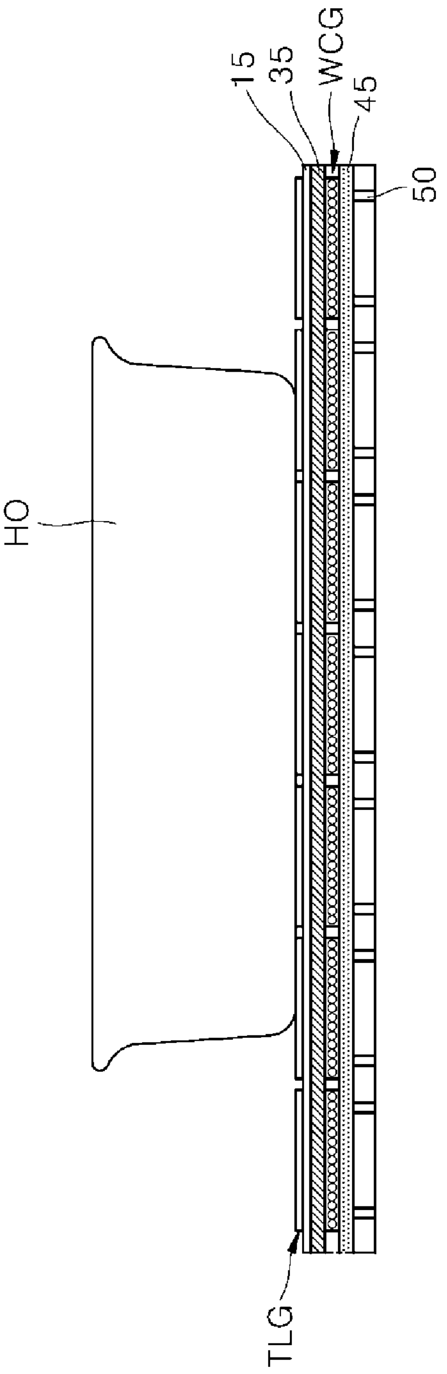
FIG. 8 shows example components and an example case of the induction heating type cooktop shown in FIG. 7.
Figure 9:
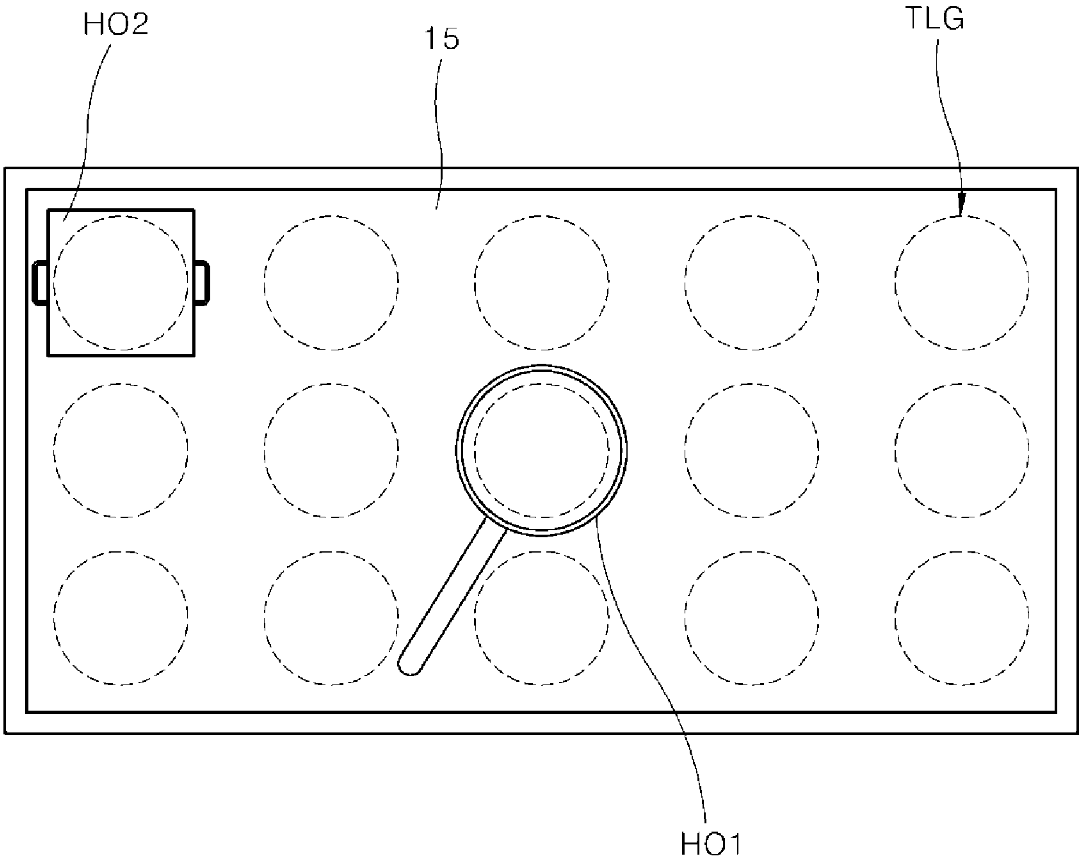
FIG. 9 shows one or more example objects placed on the induction heating type cooktop shown in FIG. 7.

FIG. 7 shows an example of an induction heating type cooktop. FIG. 8 shows example components provided in an example case of the induction heating type cooktop shown in FIG. 7. FIG. 9 shows one or more example objects placed on the induction heating type cooktop shown in FIG. 7.

In some implementations, the induction heating type cooktop 2 may include features the same as or similar to those of the induction heating type cooktop 1 in FIG. 1 except for some components and effects. Thus, one or more differences between the induction heating type cooktop 2 and the induction heating type cooktop 1 in FIG. 1 may be mainly described below.

Referring to FIGS. 7 and 8, the induction heating type cooktop 2 may be a zone free type cooktop in contrast to the induction heating type cooktop 1 in FIG. 1.

Specifically, the induction heating type cooktop 2 may include a case 25, a cover plate 20, a plurality of thin films TLGs, a thermal insulating member 35, a plurality of working coils WCGs, a shielding plate 45, a support member 50, a cooling fan (see FIG. 2), a spacer, and a control module.

In some implementations, the induction heating type cooktop 2 may include components and features similar to those of the induction heating type cooktop 1 described above. For example, the induction heating type cooktop 2 may include one or more cooling fans that are disposed at one or more sides of the case 25 and that are configured to rotate about a shaft to draw external air into the case 25. In some examples, the cooling fans may blow out internal air out of the case 25.

In some implementations, the induction heating type cooktop 2 may include one or more spacers disposed between the WCGs and the thermal insulating member 35 so that the WGGs do not directly contact the thermal insulating member 35. For example, the one or more spacers may be disposed between each working coil of the WCGs and the thermal insulating member 35.

In some implementations, the induction heating type cooktop 2 may include an input interface configured to receive user input for operating the induction heating type cooktop 2 and a control module configured to control operations of the induction heating type cooktop 2. The input interface and the control modules may be the same as or similar to those describe above with respect to the induction heating type cooktop 1. For example, the input interface may include at least one of a touch panel, a physical button, a pressure sensor, an audio sensor, or a video sensor. The control module may include a circuit connected to the input interface and the WCGs and configured to control operations of the WCGs based on user input received through the input interface.

The plurality of thin films TLGs and the plurality of working coils WCGs may be overlapped with one another in the longitudinal direction thereof, and each of the plurality of thin films TLGs and each of the plurality of working coils WCGs may be in one-to-one correspondence with each other. In some implementations, the plurality of thin films TLGs and the plurality of working coils WCGs may be in many-to-one correspondence or one-to-many correspondence, rather than one-to-one correspondence. However, for convenience of explanation, in the present disclosure, the plurality of thin films TLGs and the plurality of working coils WCGs are in one-to-one correspondence.

In some examples, the induction heating type cooktop 2 may be a zone free type cooktop including the plurality of thin films TLGs and the plurality of working coils WCGs, and one object HO may be heated by some or all of the plurality of working coils WCGs simultaneously or may be heated by some or all of the plurality of thin films TLGs simultaneously. In some implementations, the object HO may be heated using some or all of the plurality of working coils WCGs and some or all of the plurality of thin films TLGs.

In some implementations, as shown in FIG. 9, the objects HO1 and HO2 may be heated regardless of sizes, positions, and types of the objects HO1 and HO2, in the plurality of working coils (WCG in FIG. 8) and an area in which the plurality of thin films TLGs are present (for example, an area of the upper plate 15).

As various substitutions, changes, and modifications can be made within the scope that does not deviate from the technical idea of the present disclosure for the skilled person in the art to which the present disclosure pertains, the above-mentioned present disclosure is not limited to the above-mentioned implementations and accompanying drawings.

What is claimed is:

1. An induction cooktop, comprising:
a case;
a cover plate coupled to an upper end of the case, the cover plate comprising an upper plate configured to seat an object on an upper surface of the upper plate;
a working coil disposed in the case and configured to heat the object;
a thin film disposed at the upper surface of the upper plate or a lower surface of the upper plate; and
a thermal insulating member disposed vertically between the lower surface of the upper plate and the working coil,
wherein a skin depth of the thin film is greater than a thickness of the thin film such that a magnetic field of the working coil passes through the thin film and is delivered to the object, and
wherein the working coil is configured to:
inductively heat a magnetic object, and
conductively heat a non-magnetic object by inductively heating the thin film.

2. The induction cooktop of claim 1, wherein the thin film is coated on the upper surface of the upper plate or the lower surface of the upper plate.

3. The induction cooktop of claim 1, wherein the thin film is made of a conductive material and has a magnetic property.

4. The induction cooktop of claim 1, wherein the thin film is made of a conductive material and has a non-magnetic property.

5. The induction cooktop of claim 1, wherein the thickness of the thin film is between 0.1 μm and 1,000 μm.

6. The induction cooktop of claim 1, wherein the working coil is configured to, based on the magnetic object being placed on the upper surface of the upper plate, be driven to heat the magnetic object, and
wherein the thin film is configured to, based on the magnetic object being placed on the upper surface of the upper plate, define an equivalent circuit comprising (i) a resistance component and an inductor component of the magnetic object and (ii) a resistance component and an inductor component of the thin film.

7. The induction cooktop of claim 6, wherein an electrical impedance defined by the resistance component and the inductor component of the magnetic object in the equivalent circuit is less than an electrical impedance defined by the resistance component and the inductor component of the thin film.

8. The induction cooktop of claim 1, wherein the working coil is configured to:

based on the magnetic object being placed on the upper surface of the upper plate, heat the magnetic object directly by an eddy current induced in the magnetic object; and based on the non-magnetic object being placed on the upper surface of the upper plate, heat the thin film directly by an eddy current induced in the thin film to thereby indirectly heat the non-magnetic object by the heated thin film, and wherein a magnitude of the eddy current induced in the magnetic object is greater than a magnitude of the eddy current induced in the thin film.

9. The induction cooktop of claim 1, wherein the working coil is configured to, based on the non-magnetic object being placed on the upper surface of the upper plate, be driven to heat the non-magnetic object through the thin film that has an electrical impedance greater than a threshold value, and wherein an electrical impedance of the non-magnetic object is less than the threshold value.

10. The induction cooktop of claim 9, wherein the thin film is configured to, based on the non-magnetic object being placed on the upper surface of the upper plate, carry an eddy current, the eddy current not being applied to the non-magnetic object.

11. The induction cooktop of claim 1, further comprising:

a shielding plate disposed at a lower surface of the working coil and configured to block a magnetic field generated vertically below the working coil based on the working coil being driven;

a support member disposed between a lower surface of the shielding plate and a lower surface of the case and configured to support the shielding plate upward; and a cooling fan disposed inside the case and configured to cool the working coil.

12. The induction cooktop of claim 11, wherein the support member comprises an elastic body configured to support the shielding plate upward.

13. The induction cooktop of claim 11, wherein the cooling fan is configured to:

draw external air from an outside of the case and transfer the drawn external air toward the working coil; or draw internal air from an inside of the case and discharge the drawn internal air toward the outside of the case, and wherein the thermal insulating member is configured to block heat transfer, to the working coil, from the object or the thin film that is heated based on the working coil being driven.

14. The induction cooktop of claim 6, wherein the resistance component and the inductor component of the magnetic object in the equivalent circuit are connected to each other electrically in series, wherein the resistance component and the inductor component of the thin film in the equivalent circuit are connected to each other electrically in series, and wherein the resistance component and the inductor component of the thin film in the equivalent circuit are connected to the resistance component and the inductor component of the magnetic object electrically in parallel.

15. The induction cooktop of claim 1, wherein the thin film is configured to contact the object placed on the upper surface of the upper plate.

16. The induction cooktop of claim 1, wherein the thin film is configured to, based on the non-magnetic object being placed on the upper surface of the upper plate, define an equivalent circuit comprising a resistance component and an inductor component of the thin film, and wherein the working coil is configured to, based on the non-magnetic object being placed on the upper surface of the upper plate, be driven to heat the non-magnetic object by heat generated from the thin film by induction.

17. The induction cooktop of claim 1, wherein the thin film vertically overlaps with a portion of the upper surface of the upper plate on which the object is seated, the thin film being located vertically above the working coil at a position corresponding to the working coil, and wherein the thickness of the thin film is predetermined to enable the thin film to be inductively heated by the working coil.

18. The induction cooktop of claim 1, wherein the thin film has a ring shape comprising a plurality of concentric circles having different diameters.

19. The induction cooktop of claim 1, further comprising:

a plurality of working coils disposed in the case and spaced apart from one another, the plurality of working coils including the working coil; and a plurality of thin films attached to the upper plate and spaced apart from one another, the plurality of thin films including the thin film, wherein each of the plurality of thin films is positioned vertically above at a position corresponding to one of the plurality of working coils.

20. The induction cooktop of claim 1, further comprising:

a plurality of thin films including the thin film; and a plurality of working coils including the working coil, wherein the plurality of thin films correspond to one of the plurality of working coils, or one of the plurality of thin films corresponds to the plurality of working coils.

21. The induction cooktop of claim 20, wherein some or all of the plurality of working coils are configured to heat the object simultaneously, or some or all of the plurality of thin films are configured to heat the object simultaneously.

* * * * *